United States Patent
Yoon (10) Patent No.: US 7,550,227 B2
(45) Date of Patent: Jun. 23, 2009

(54) SECONDARY BATTERY

(75) Inventor: Heui Sang Yoon, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 478 days.

(21) Appl. No.: 10/971,625

(22) Filed: Oct. 22, 2004

(65) Prior Publication Data
US 2005/0089753 A1  Apr. 28, 2005

(30) Foreign Application Priority Data
Oct. 24, 2003  (KR) ............... 10-2003-0074844

(51) Int. Cl.
*H01M 2/26* (2006.01)
(52) U.S. Cl. .............. 429/121; 429/163; 429/175
(58) Field of Classification Search .......... 429/121, 429/163, 175
See application file for complete search history.

(56) References Cited

U.S. PATENT DOCUMENTS

| 6,808,844 B2 * | 10/2004 | Ehara ............... 429/175 |
| 2003/0180582 A1 * | 9/2003 | Masumoto et al. ........ 429/7 |

FOREIGN PATENT DOCUMENTS

KR  2002-0077175  10/2002

OTHER PUBLICATIONS

Korean Patent Abstract for Korea Publication No. 1020020077175 A, dated Oct. 11, 2002.

* cited by examiner

*Primary Examiner*—Jane Rhee
(74) *Attorney, Agent, or Firm*—Christie, Parker & Hale, LLP (57) ABSTRACT

A secondary battery pack. The secondary battery pack includes a bare cell including an electrode assembly having an anode, a cathode and a separator, a vessel-type can for receiving the electrode assembly and an electrolyte therein, and a cap assembly for covering an opening section of the can, a battery component connected to the bare cell, a molding resin section filled in a gap formed between the bare cell and the battery component so as to fixedly couple the bare cell with the battery component, and a protrusion provided in the bare cell while protruding toward the molding resin section from a boundary surface between the bare cell and the molding resin section. The protrusion is coupled with a holder. When the battery pack is made using molding resin, the battery pack is prevented from being deformed by external twist forces or external bending forces applied to the battery pack. Since the protrusion is formed on the cap plate and the holder is coupled with the protrusion, the battery pack is prevented from being twisted or bent by external forces applied to the battery pack.

14 Claims, 5 Drawing Sheets

SECONDARY BATTERY

CROSS-REFERENCE TO RELATED APPLICATION

This application claims priority to and the benefit of Korean patent application 10-2003-74844 filed in the Korean Intellectual Property Office on Oct. 24, 2003, the entire content of which is incorporated herein by reference.

BACKGROUND OF THE INVENTION

1. Field of the Invention

The present invention relates to a secondary battery, and more particularly to a secondary battery pack including a bare cell having an electrode assembly, a can and a cap assembly and a protective circuit module electrically connected to the bare cell by applying molding resin thereto.

2. Description of the Related Art

Secondary batteries are rechargeable batteries, which can be made in a compact size with a large capacity. Due to these characteristics of the secondary batteries, studies and research have been carried out for developing secondary batteries. Among secondary batteries, Nickel Metal Hydride (Ni-MH) batteries, Lithium (Li) batteries and Lithium-Ion (Li-ion) batteries have been developed and used recently.

Generally, a bare cell of a secondary battery can be made by accommodating an electrode assembly having an anode, a cathode and a separator in a can made from aluminum or an aluminum alloy, sealing the can by using a cap assembly, and injecting an electrolyte into the can. Although it is possible to make the can using an iron material, the can may also be made using aluminum or an aluminum alloy because aluminum or the aluminum alloy allows the secondary battery to be lightweight without causing the can to erode even if the secondary battery is used for a long period of time under high voltage.

The sealed bare cell is connected to safety units, such as a positive temperature coefficient (PTC) device, a thermal fuse and a protective circuit module (PCM) or battery components, and is accommodated in a separate pack. Otherwise, when the bare cell is connected to the PCM and battery components, molding resin is filled in a gap formed between the bare cell and the PCM or battery components so that the bare cell is integrally formed with the PCM and battery components, thereby forming a battery pack.

The safety units are connected to a positive terminal and a negative terminal of the bare cell by means of a conductive structure called a "lead plate". When voltage of the battery suddenly rises due to high temperature of the battery or an excessive recharge/discharge of the battery, the safety units shuts off current to the battery, thereby preventing the battery from being damaged.

Figure 1:
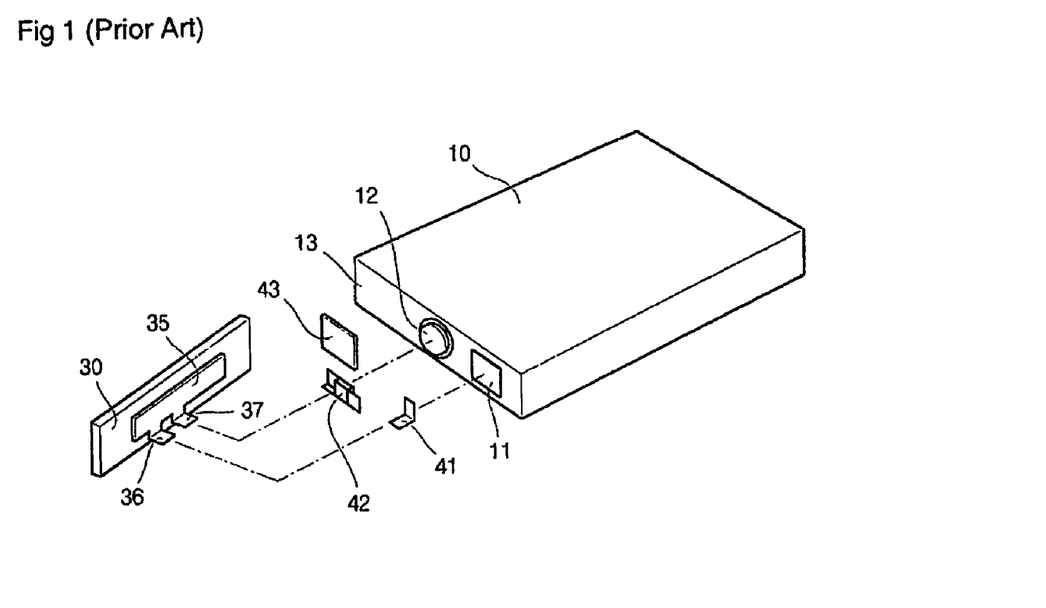
FIG. 1 is a partially exploded perspective view showing a conventional lithium ion battery pack before the battery pack is assembled using molding resin.
Figure 2:
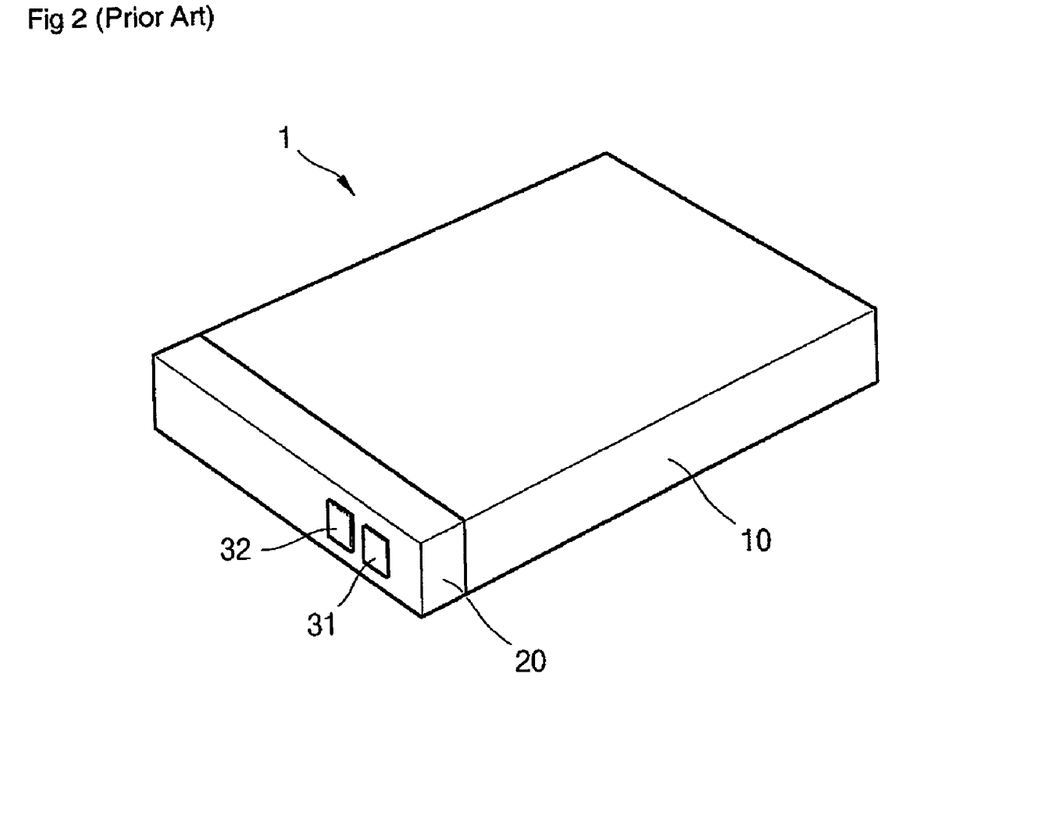
FIG. 2 is a perspective view showing a conventional lithium ion battery pack assembled using molding resin.

FIG. 1 is a schematic exploded perspective view showing a conventional lithium ion battery pack before molding resin is applied thereto, and FIG. 2 is a perspective view showing a conventional lithium ion battery pack assembled by means of molding resin.

Referring to FIGS. 1 and 2, a protective circuit module 30 is aligned in parallel to one surface of a bare cell 10 of the lithium ion battery pack in which positive and negative terminals 11, 12 are formed. In addition, molding resin is filled in a gap formed between the bare cell 10 and the protective circuit module 30. Although molding resin can be applied to an outer surface of the protective circuit module 30 when filling molding resin in the gap, external input/output terminals 31, 32 of the battery must be exposed to an exterior.

The positive terminal 11 and the negative terminal 12 are aligned on one surface of the bare cell 10 in parallel to the protective circuit module 30. The positive terminal 11 can be formed as a part of a cap plate 13 made from aluminum or an aluminum alloy, or can be formed as a metal plate containing nickel coupled to the cap plate 13. The negative terminal 12 protrudes from the cap plate 13 and is electrically insulated from the cap plate 13 by means of an insulation gasket aligned around the negative terminal 12.

The protective circuit module 30 includes a panel made from resin and circuits formed on the panel. The external input/output terminals 31, 32 are formed at the outer surface of the protective circuit module 30. The protective circuit module 30 has a shape and a size identical to those of a corresponding surface of the bare cell 10, in which the cap plate 13 is formed.

The protective circuit module 30 is provided at an inner surface thereof with a circuit section 35 and connection terminals 36, 37. The circuit section 35 includes protective circuits for protecting the battery from being over-charged or over-discharged. The circuit section 35 is electrically connected to the external input/output terminals 31, 32 by means of a conductive structure extending by passing through the protective circuit module 30.

Connection leads 41, 42 and an insulation plate 43 are aligned between the bare cell 10 and the protective circuit module 30. The connection leads 41, 42 are generally made from nickel and electrically connected to the cap plate 13 and the connection terminals 36, 37 of the protective circuit module 30. The connection leads 41, 42 have L-shaped or planar-shaped structures. In addition, the connection leads 41, 42 can be connected to terminals 11, 12, 36, 37 by means of resistance spot welding. In FIGS. 1 and 2, a breaker is additionally provided on the connection lead 42 provided between the protective circuit module and the negative terminal. In this case, the breaker is not formed on the circuit section 35 of the protective circuit module. The insulation plate 43 is provided in order to insulate between the connection lead 42 connected to the negative terminal 12 and the cap plate which functions as an anode.

However, when a battery pack 1 is made by assembling the bare cell 10 with the protective circuit module 30 and battery components using molding resin, a molding resin section 20 for fixedly coupling the protective circuit module 30 and battery components to the bare cell 10 may be easily twisted or bent if external force is applied thereto because the molding resin section 20, which is made from a soft material different from the bare cell 10 including the cap plate 13 and the can made from a metal, only makes contact with a small portion of the bare cell 10.

Figure 3:
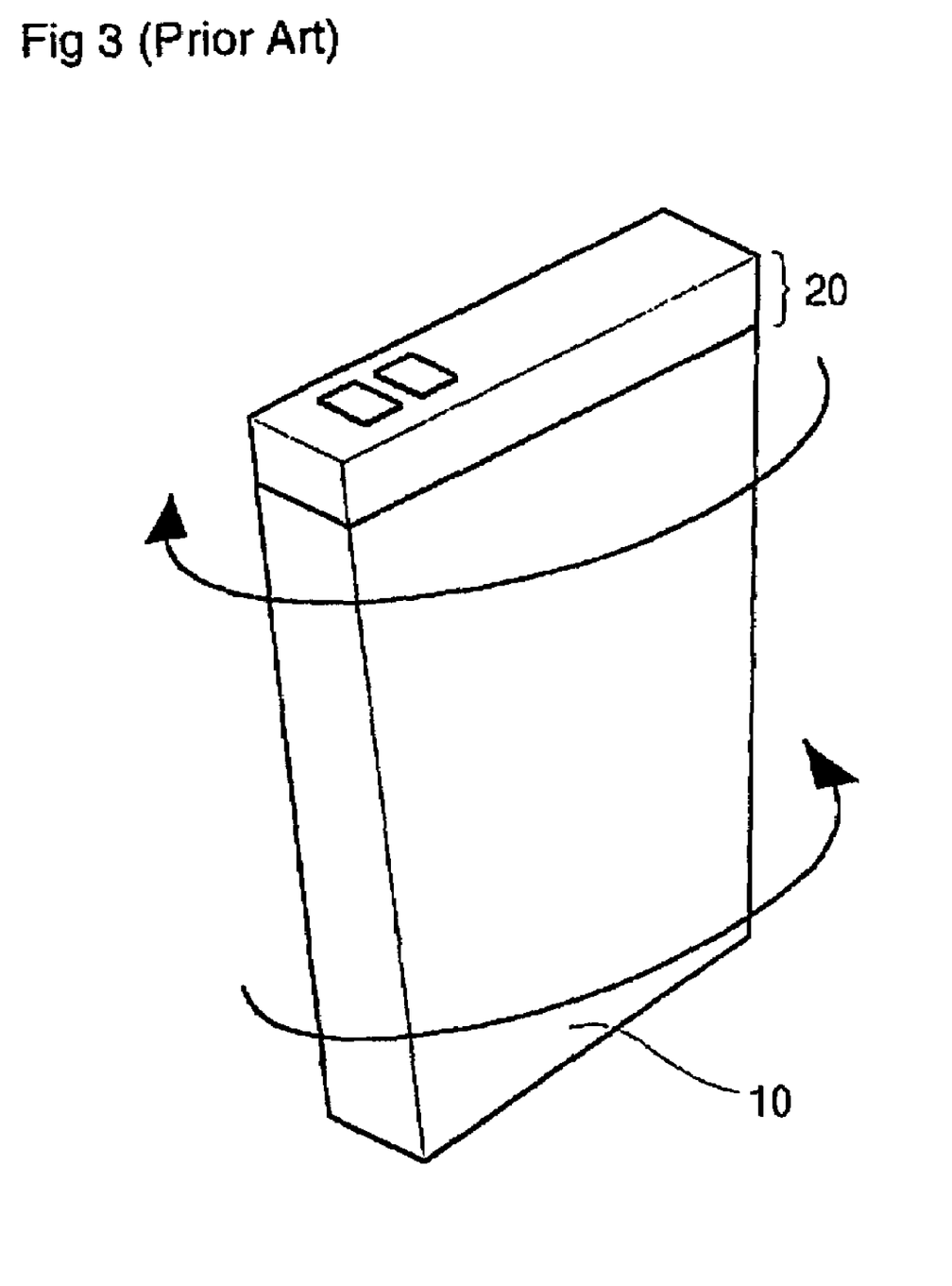
FIG. 3 is a perspective view showing a conventional battery pack which is twisted due to external force applied thereto.

FIG. 3 is a perspective view showing the molding section 20 twisted from the bare cell due to external force applied to a conventional battery pack.

Referring to FIGS. 1 to 3, if the molding section 20 is twisted from the bare cell 10 more than a predetermined angle, a problem may occur in an electric connection line formed through the positive and negative terminals 11, 12 of the bare cell 10. The connection leads 41, 42, and the input/output terminals 31, 32 of the protective circuit board 30 and safety units of the battery may become non-operational, even if the molding resin section 20 is not completely broken.

In relation to a twist of the battery pack caused by external force applied to the battery pack in a direction indicated by arrows in FIG. 3, if the connection leads 41, 42 have planar structures, the conventional battery pack has no protrusions protruding vertically to a cap plate surface in order to prevent the battery pack from being deformed when the molding resin section 20 is twisted or slidably moved with respect to the bare cell 10. In addition, even if the connection leads 41, 42 and the connection terminals 36, 37 have L-shaped structures so that welding parts of the connection leads 41, 42 and the connection terminals 36, 37 may protrude from the cap plate surface, since the welding parts protruding from the cap plate surface are not provided for reinforcing mechanical strength of the battery pack, but rather are provided for an electric connection on a predetermined part of the cap plate surface only, the welding parts cannot function as supporters against external force causing the battery pack to twist or bend.

SUMMARY OF THE INVENTION

An embodiment of the present invention provides a secondary battery having a structure capable of preventing a bare cell and a molding resin section from being broken or deformed due to bending or twisting of a battery pack when the battery pack is made by applying molding resin thereto.

The secondary battery has a bare cell including an electrode assembly having an anode, a cathode and a separator, a vessel-type can for receiving the electrode assembly and an electrolyte therein, and a cap assembly for covering an opening section of the can, a battery component connected to the bare cell, a molding resin section filled in a gap formed between the bare cell and the battery component so as to fixedly couple the bare cell with the battery component, and a protrusion provided in the bare cell while protruding toward the molding resin section from a boundary surface between the bare cell and the molding resin section. In one exemplary embodiment the protrusion is coupled to a holder.

Additionally, the protrusion may be integrally formed with the cap assembly in order to enhance coupling strength between the protrusion and the cap assembly. If the coupling strength between the protrusion and the cap assembly is enhanced, the protrusion may exhibit greater resistance to deformation of the molding resin section when external twist forces or external bending forces are applied to the battery pack.

Since the cap plate is formed as a body of the cap assembly, the protrusion is integrally formed with the cap plate, and thus, the cap, through a molding process.

According to one exemplary embodiment of the present invention, the holder is coupled with or welded to the protrusion formed in the bare cell of the battery. The holder has a thickness larger than a thickness of the protrusion so that an end portion of the cap assembly may have a height greater than the thickness of the protrusion when the holder is coupled with the protrusion.

The protrusion is formed at an opposite portion of a connection lead attached to the bare cell for an electric connection between the bare cell and the protective circuit module, and at least one part of the connection lead is aligned perpendicularly to the boundary surface.

The can is made from an iron material or a metallic material. According to one exemplary embodiment of the present invention, the can is made from aluminum or an aluminum alloy.

DETAILED DESCRIPTION

Figure 4:
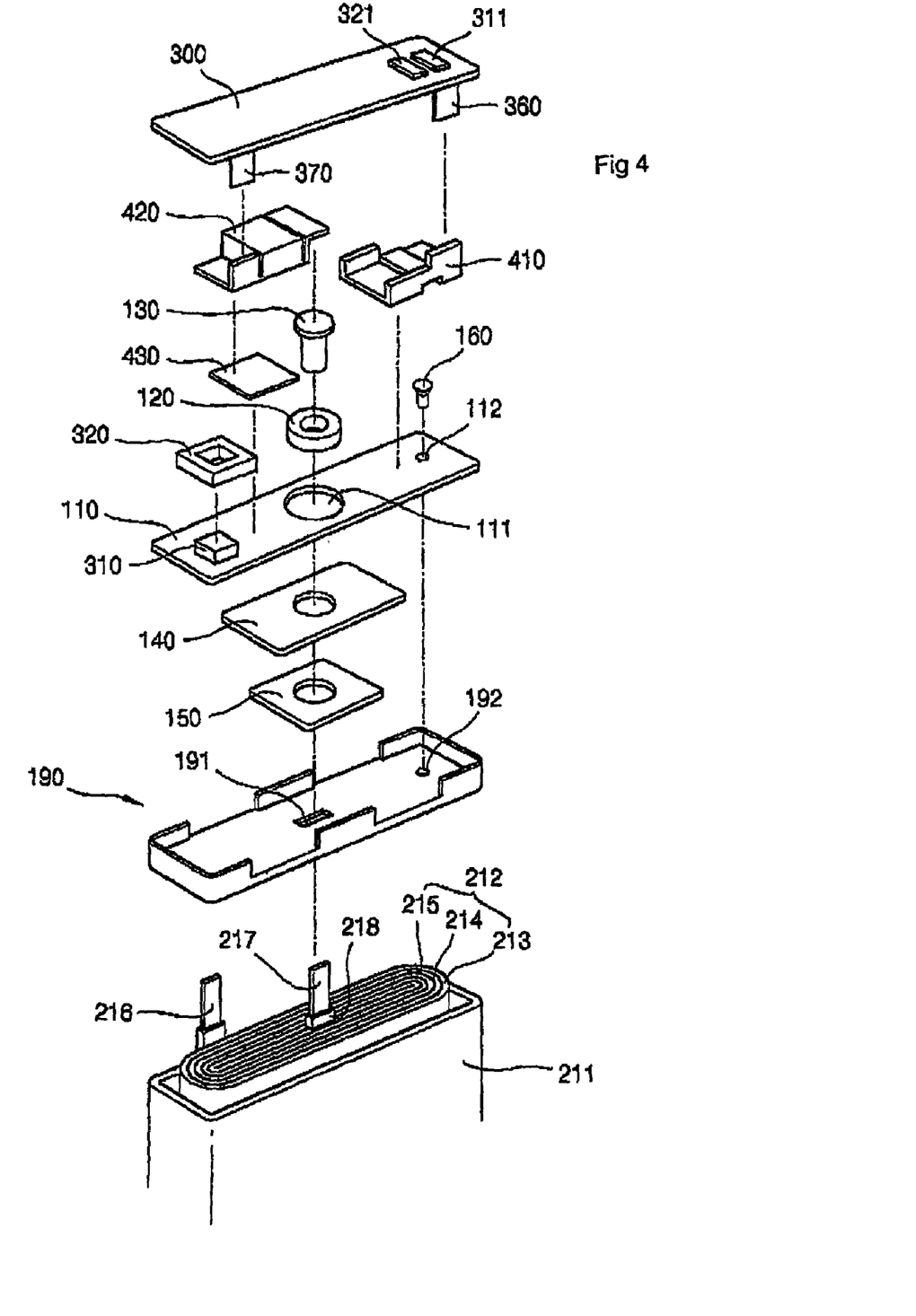
FIG. 4 is an exploded perspective view of a lithium battery pack according to an exemplary embodiment of the present invention, in which a holder is coupled to a protrusion of a bare cell and a molding resin section is omitted.

Referring to FIG. 4, a lithium battery pack has a bare cell including a can 211, an electrode assembly 212 accommodated in the can, and a cap assembly coupled to an opened upper end of the can in order to seal the upper end of the can.

The electrode assembly 212 includes an anode 213, a separator 214, and a cathode 215 in the form of thin plates or thin films, which are wound in a spiral pattern.

The anode 213 includes a positive electrode collector made from a thin metal plate having superior conductivity, such as an aluminum foil, and a positive electrode active material having lithium-based oxide as a main component and coated at both sides of the anode. A positive electrode lead 216 is electrically connected to a predetermined area of the positive electrode collector of the anode 213, in which the positive electrode active material is not formed.

The cathode 215 includes a negative electrode collector made from a thin metal plate having superior conductivity, such as a copper foil, and a negative electrode active material having a carbon-based material as a main component and coated at both sides of the cathode 215. A negative electrode lead 217 is electrically connected to a predetermined area of the negative electrode collector of the cathode 215, in which the negative electrode active material is not formed.

The anode 213 and the cathode 215 may have polarity opposite to the polarity of the positive electrode lead 216 and the negative electrode lead 217, respectively. In addition, insulation tapes 218 are wound around the positive electrode lead 216 and the negative electrode lead 217 corresponding to an end portion of the electrode assembly 212 in order to prevent a short-circuit from occurring between the anode 213 and the cathode 215.

The separator 214 is made from polyethylene, polypropylene, or co-polymer of polyethylene and polypropylene. Additionally, the separator 214 may have a width larger than a width of the anode 213 or the cathode 215 in order to prevent a short-circuit from occurring between the anode and the cathode.

The square type can 211 is fabricated in a hexahedral structure by using aluminum or an aluminum alloy. The electrode assembly 212 is accommodated in the can 211 through the opened upper end of the can. That is, the can 211 functions as a container for receiving the electrode assembly 212 and an electrolyte therein. The can 211 may act as a terminal. However, according to the present embodiment, a cap plate 110 of the cap assembly may act as a positive electrode terminal instead of the can 211.

The cap assembly is provided with the planar cap plate 110 having a size and a shape corresponding to the opened upper end of the can 211. The cap plate 110 is formed at a center portion thereof with a perforated hole 111 in such a manner that an electrode terminal 130 can pass through the perforated hole 111. A gasket 120 having a tube-shape is provided at an outer portion of the electrode terminal 130 passing through the center portion of the cap plate 110 in order to electrically insulate the electrode terminal 130 from the cap plate 110. An insulation plate 140 is positioned below the cap plate 110 in the vicinity of the perforated hole 111 formed at the center of the cap plate 110. A terminal plate 150 is installed below the insulation plate 140.

The electrode terminal 130 is inserted into the perforated hole 111 while passing through the gasket 120. A lower portion of the electrode terminal 130 is electrically connected to the terminal plate 150 by interposing the insulation plate 140 therebetween.

The positive electrode lead 216 withdrawn from the anode 213 is welded to a lower surface of the cap plate 110 and a negative electrode lead 217 withdrawn from the cathode 215 is welded to a lower surface of the electrode terminal 130 while being folded in an oblique shape.

The electrode assembly 212 is provided at an upper surface thereof with an insulation case 190 for electrically insulating the electrode assembly 212 from the cap assembly while covering an upper end of the electrode assembly 212. The insulation case 190 is made from high polymer resin having a superior insulation property, such as polypropylene. The insulation case 190 is formed with a lead hole 191 at a center thereof in such a manner that the negative electrode lead 217 formed at a center portion of the electrode assembly 212 can pass through the lead hole 191. In addition, an electrolyte hole 192 is formed at one side of the insulation case 190. According to another embodiment of the present invention the electrolyte hole 192 is not formed in the insulation case 190 and a second lead hole for the positive electrode lead 216 is formed beside the lead hole 191.

An electrolyte injection hole 112 is formed at a side of the cap plate 110. A plug 160 is installed in the electrolyte injection hole 112 in order to seal the electrolyte injection hole 112 after the electrolyte has been injected into the can. The plug 160 includes a ball-shaped member made from aluminum or an aluminum alloy and is mechanically press-fitted into the electrolyte injection hole 112. In this state, the plug 160 is welded to the cap plate 110 in order to seal the electrolyte injection hole 112. In order to allow the plug 160 to be easily welded to the cap plate 110, the plug 160 is made from a material substantially similar or identical to a material of the cap plate 110.

In order to fixedly couple the cap assembly with the can 211, a peripheral portion of the cap plate 110 is welded to a sidewall of the can 211. After coupling the cap assembly to the can 211, the upper end of the can 211 forming an opening is bent inwardly so that a flange is formed above the cap plate 110. In FIG. 4, 430 represents an insulation plate, and 311 and 321 represent input/output terminals.

Figure 5:
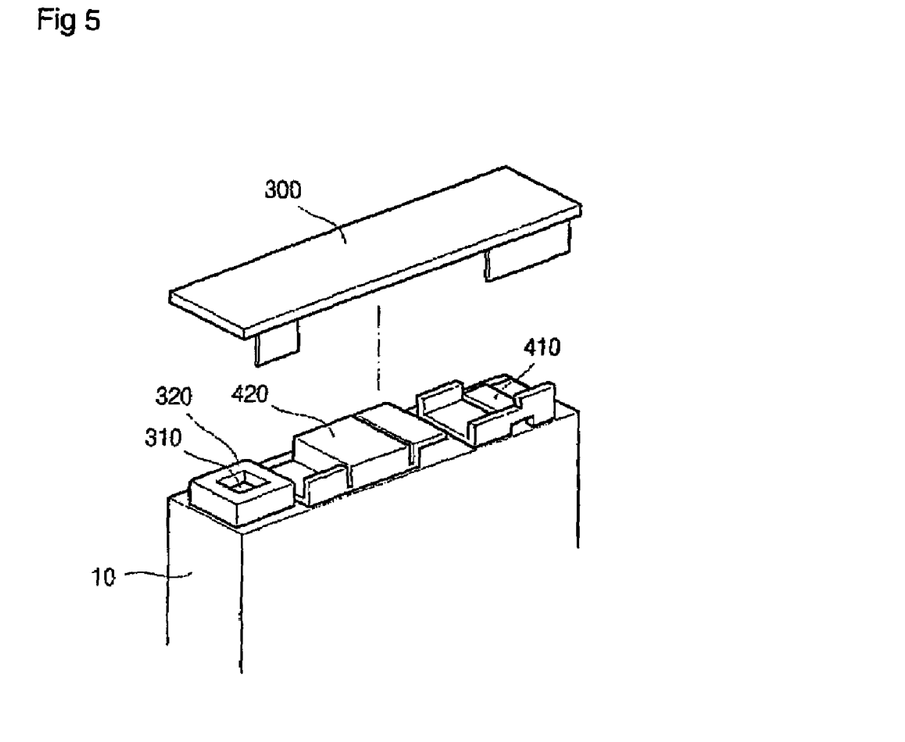
FIG. 5 is an exploded perspective view of a secondary battery according to an exemplary embodiment of the present invention before a protective circuit module is connected to a bare cell.

Referring to FIGS. 4 and 5, a lead plate 410 having sidewalls aligned in parallel to each other and a bottom plate connecting lower parts of the sidewalls to each other is provided at an upper portion of the cap plate 110. The lead plate 410 has a hole or groove formed corresponding to the plug 160 and is welded to a peripheral portion of the plug 160. Although the lead plate 410 is provided for an electric connection, sidewalls of the lead plate are stuck into the molding resin section at a boundary between the lead plate and the molding resin section, thereby fixedly securing the molding resin section to the bare cell. The lead plate 410 has ⊏-shaped sidewalls or L-shaped sidewalls.

In an exemplary embodiment, the lead plate 410 is made from nickel, a nickel alloy or nickel-coated stainless steel. Generally, the lead plate 410 has a thickness of about 0.05 to 0.5 mm. The thickness of the lead plate 410 relates to a thickness of the can 211 and welding work. If the lead plate 410 is very thick, the battery pack, which is made by filling resin into a gap formed between the protective circuit module 300 and the can 211 sealed with the cap assembly, represents superior resistance against external force causing the battery pack to twist or bend.

Since the cap plate 110 is made from aluminum or an aluminum alloy having superior thermal conductivity and low resistance, laser welding is carried out for the cap plate 110 instead of resistance welding. The lead plate 410 is welded to the cap plate 110 in such a manner that a welding section is formed between the lead plate and the cap plate with a thickness of about 0.1 to 0.5 mm to match the thickness and material of the cap plate and material of the lead plate 410. However, if the cap plate 110 and the lead plate 410 are very thick, the thickness of the welding section can be increased in order to reinforce welding strength between the lead plate 410 and the cap plate 110.

The welding section may be formed in various shapes depending on shapes and areas of plates to be welded. For instance, the welding section has a straight line structure, a circular structure, a linear structure having a plurality of lines in parallel to each other, ⊐-shaped structure, or ⊏-shaped structure.

Figure 6A:
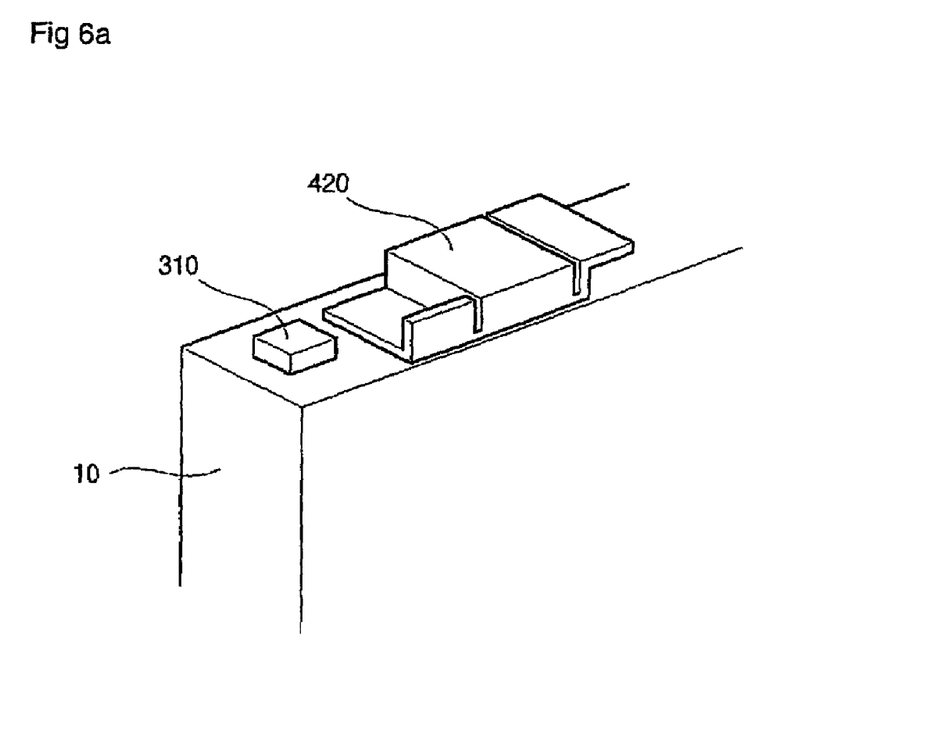
FIGS. 6a and 6b are partially perspective views of a secondary battery according to an exemplary embodiment of the present invention showing a protrusion and a holder coupled with a protrusion.
Figure 6B:
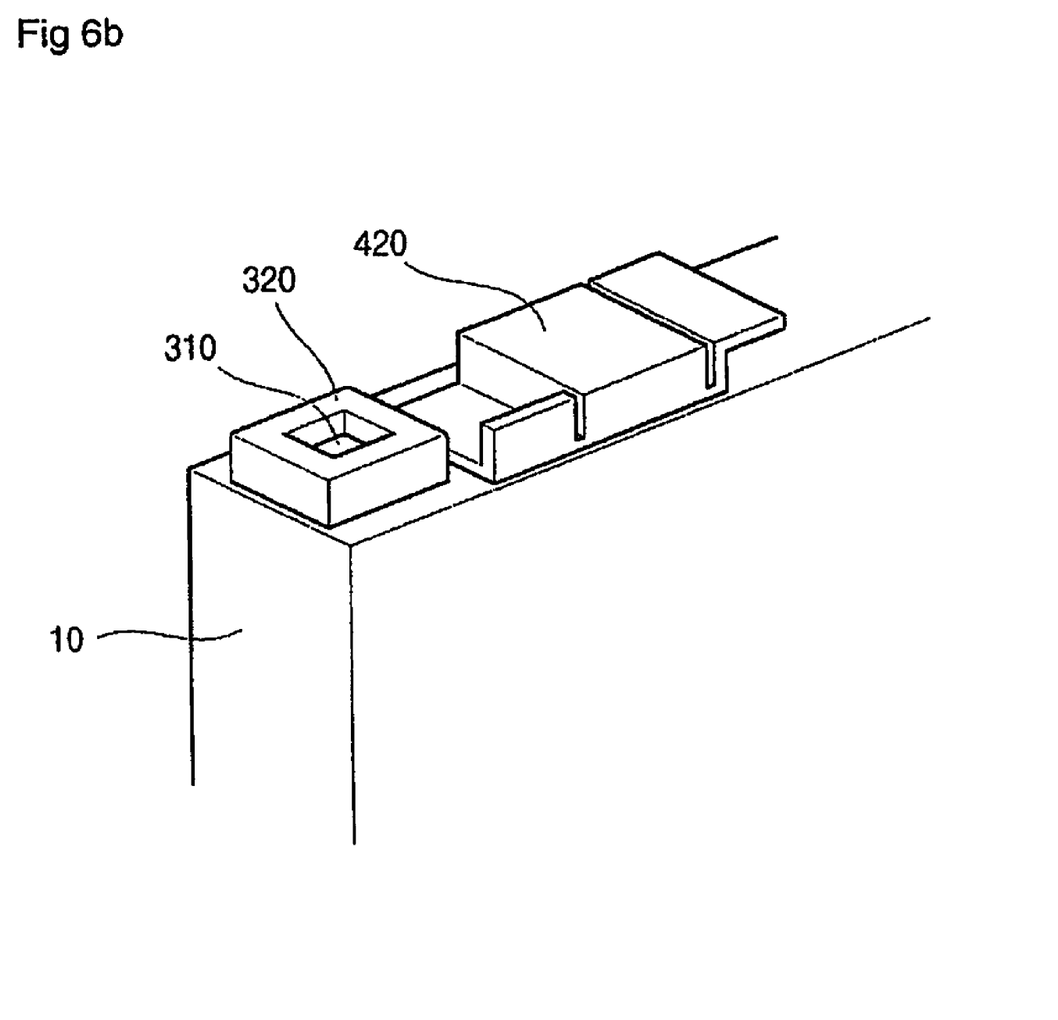

FIGS. 6a and 6b are partially perspective views of a secondary battery according to an exemplary embodiment of the present invention showing a protrusion 310 and a holder 320 coupled with the protrusion.

Referring to FIGS. 4 to 6, the protrusion 310, which is a main component of the present invention, is formed on an upper surface of the cap plate 110 in opposition to the lead plate 410 about the electrode terminal 130. The protrusion 310 has a rectangular column shape. Coupling strength between the protrusion 310 and the cap plate 110 may be reinforced in order to allow the protrusion 310 to act as a supporter resisting against external force. Accordingly, the protrusion 310 is made from a material substantially similar or identical to a material of the cap plate 110 and is integrally formed with the cap plate 110. If the protrusion 310 is made separately from the cap plate 110, the protrusion 310 may be made from a material allowing the protrusion 310 to be welded to the cap plate 110 with sufficient welding strength.

The holder 320 is coupled with the protrusion 310. The holder 320 is formed at a center portion thereof with a hole into which the protrusion 310 is press-fitted. Accordingly, the holder 320 cannot be easily separated from the protrusion 310 even if external force is applied to a side portion of the holder 320. The holder 320 can be coupled with the protrusion 310 by applying force to the holder 320. However, in order to enhance coupling force between the protrusion 310 and the holder 320, the holder 320 may be welded to the protrusion 310. If the holder 320 is welded to the protrusion 310, the holder 320 may be made with a material identical to or substantially similar to a material of the protrusion 310.

The holder hole or groove may be formed only at a lower surface of the holder 320. However, if the holder 320 has a perforated through-hole as shown in FIG. 5, molding resin may be filled into the perforated through-hole of the holder 320 so that mechanical coupling force between the holder 320 and the bare cell 10 may be improved. The holder 320 has a thickness larger than a thickness of the protrusion 310 formed on the cap plate 110. In this case, even if the protrusion 310 is made thin due to a structural problem of the cap plate 110, the height of the structure is not reduced because the holder 310 is installed on the cap plate 110. Therefore, when an external twist force is applied to the battery pack, the molding resin section is prevented from sliding along the thin protrusion 310 and is not easily separated from the bare cell.

Similar to a relationship between the protrusion 310 and the holder 320, the electrode terminal 130 aligned at a center of the cap assembly while protruding from the cap plate 110 may be provided with a tap (not shown). The tap would have high conductivity. Since the tap is positioned at the center of the cap plate 110, the tap may act as a supporter against an external bending force even though the tap has low resistance to an external twist force.

A breaker 420, which is made separately, the protective circuit module 300 equipped with protective circuits, and battery components may be installed in the battery having the lead plate 410 welded to the battery. The lead plate 410 is connected to a positive electrode connection terminal 360 of the protective circuit module 300 as an anode, and the electrode terminal 130 through the end of the breaker 420 connected to the electrode terminal 130 is connected to a negative electrode connection terminal 370 of the protective circuit module 300 as a cathode. The electrode structure and polarity may vary depending on embodiments. The battery having the protective circuit module 300 and battery components may be accommodated in a separate housing (not shown). In addition, low-temperature molding resin may be filled in a gap formed between the protective circuit module 300 and the cap plate 110 through a hot melt process. Additionally, a resin coating process may be carried out for making the battery pack.

According to embodiments of the present invention, when the battery pack is made by using molding resin, the battery pack is prevented from being deformed by external twist forces or external bending forces applied to the battery pack.

In addition, since the protrusion is formed on the cap plate and the holder is coupled with the protrusion, the battery pack is prevented from being twisted or bent by external forces applied to the battery pack.

What is claimed is:

1. A secondary battery comprising:
    a bare cell comprising an electrode assembly having an anode, a cathode and a separator, a vessel-type can for receiving the electrode assembly and an electrolyte therein, and a cap assembly for covering an opening of the can;
    a battery component connected to the bare cell;
    a molding resin in a gap between the bare cell and the battery component to fixedly couple the bare cell with the battery component;
    a holder on a boundary surface between the bare cell and the molding resin, the holder contacting the molding resin and providing resistance to an external twist force applied to the secondary battery; and
    a protrusion recessed within the holder, the protrusion extending toward the molding resin from the boundary surface.

2. The secondary battery as claimed in claim 1, wherein the protrusion is integral with the cap assembly.

3. The secondary battery as claimed in claim 2, wherein the protrusion is molded with the cap assembly.

4. The secondary battery as claimed in claim 1, wherein a lead plate protruding toward the molding resin from the boundary surface and providing for an electric connection, is located at a first end of the cap assembly, and the protrusion is located at a second end of the lead plate.

5. The secondary battery as claimed in claim 1, wherein a conductive tap is attached to an electrode terminal at a center of the cap assembly.

6. The secondary battery as claimed in claim 1, wherein the can is made from aluminum alloy.

7. A secondary battery comprising:
    a bare cell comprising an electrode assembly having an anode, a cathode and a separator, a vessel-type can for receiving the electrode assembly and an electrolyte therein, and a cap assembly for covering an opening of the can;
    a battery component connected to the bare cell;
    a molding resin filling a gap between the bare cell and the battery component so as to fixedly couple the bare cell with the battery component;
    a holder on a boundary surface between the bare cell and the molding resin; and
    a protrusion within the holder protruding toward the molding resin from the boundary surface, the protrusion being welded to the holder.

8. The secondary battery as claimed in claim 7, wherein the holder is made from a material substantially similar to a material of the protrusion.

9. A second battery assembly comprising:
    an electrode assembly comprising an anode, a cathode and a separator mounted in a vessel-type can having an electrolyte therein;
    a protective circuit module having an external positive terminal connected to the anode and an external negative terminal connected to the cathode; and
    a cap assembly located between the protective circuit module and the electrode assembly for covering an opening of the vessel-type can, the cap assembly having a holder between the cap assembly and the protective circuit module and a protrusion recessed within the holder and extending toward the protective circuit module, the holder and the protrusion providing resistance to an external twist force applied to the battery;
    wherein a molding resin fills a gap between the cap assembly and the protective circuit module and contacts the protrusion and the holder for preventing twisting deformation between the protective circuit module and the can.

10. The secondary battery assembly of claim 9, wherein the protrusion is integral with the cap assembly.

11. The secondary battery assembly of claim 9, wherein the anode, the separator and the cathode are thin plates or thin films wound in a spiral.

12. The secondary battery assembly of claim 9, wherein the the anode is connected to the external positive terminal through a lead plate coupled to the cap assembly, and
    wherein the cathode is connected to the external negative electrode by an electrode terminal passing electrically isolated through the cap assembly.

13. The secondary battery assembly of claim 9, wherein the cap assembly includes an electrolyte injection hole to allow electrolyte to be injected into the can.

14. The secondary battery assembly of claim 12, wherein the lead plate has substantially parallel sidewalls, the substantially parallel sidewalls being immersed in the molding resin and providing resistance to twisting between the protective circuit module and the can.

* * * * *

UNITED STATES PATENT AND TRADEMARK OFFICE
CERTIFICATE OF CORRECTION

| | |
|---|---|
| PATENT NO. | : 7,550,227 B2 |
| APPLICATION NO. | : 10/971625 |
| DATED | : June 23, 2009 |
| INVENTOR(S) | : Heui Sang Yoon |

It is certified that error appears in the above-identified patent and that said Letters Patent is hereby corrected as shown below:

| | |
|---|---|
| Column 7, Claim 4, line 62 | Delete "electric" Insert -- electrical -- |
| Column 8, Claim 6, line 5 | After "from" Insert -- an -- |
| Column 8, Claim 12, line 49 | After "wherein" Delete "the" |
| Column 8, Claim 12, line 53 | Delete "electrode" Before "by" and Insert -- terminal -- |

Signed and Sealed this
Twenty-sixth Day of April, 2011

David J. Kappos
*Director of the United States Patent and Trademark Office*